United States Patent
Kodama

(10) Patent No.: US 10,382,679 B2
(45) Date of Patent: Aug. 13, 2019

(54) DRAWING APPARATUS, DRAWING METHOD, AND DRAWING PROGRAM

(71) Applicant: Socionext Inc., Yokohama-shi, Kanagawa (JP)

(72) Inventor: Yuko Kodama, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 218 days.

(21) Appl. No.: 15/096,786

(22) Filed: Apr. 12, 2016

(65) Prior Publication Data
US 2016/0353019 A1    Dec. 1, 2016

(30) Foreign Application Priority Data

May 28, 2015 (JP) ................................ 2015-108715

(51) Int. Cl.
| | |
|---|---|
| G06T 3/40 | (2006.01) |
| H04N 5/232 | (2006.01) |
| G06T 5/00 | (2006.01) |
| H04N 5/247 | (2006.01) |
| G06T 7/33 | (2017.01) |

(52) U.S. Cl.
CPC ....... H04N 5/23238 (2013.01); G06T 3/4038 (2013.01); G06T 5/006 (2013.01); G06T 7/33 (2017.01); H04N 5/247 (2013.01); *G06T 2200/32* (2013.01); *G06T 2207/10016* (2013.01); *G06T 2207/30252* (2013.01)

(58) Field of Classification Search
CPC .................. G06T 7/33; G06T 2200/32; G06T 2207/10016; G06T 2207/30252; G06T 3/4038; G06T 5/006; H04N 5/23238; H04N 5/247
See application file for complete search history.

(56) References Cited

U.S. PATENT DOCUMENTS

| | | | |
|---|---|---|---|
| 7,161,616 B1 | 1/2007 | Okamoto et al. | |
| 9,706,132 B2 * | 7/2017 | Nisenzon | H04N 9/735 |

(Continued)

FOREIGN PATENT DOCUMENTS

| | | |
|---|---|---|
| CN | 1344470 A | 4/2002 |
| CN | 103778617 A | 5/2014 |

(Continued)

OTHER PUBLICATIONS

Extended European Search Report of related European Patent Application No. 16164738.3 dated Nov. 2, 2016.

(Continued)

*Primary Examiner* — Jayanti K Patel
*Assistant Examiner* — Shadan E Haghani
(74) *Attorney, Agent, or Firm* — Arent Fox LLP

(57) ABSTRACT

A drawing apparatus includes a first control unit and a second control unit. The first control unit receives a plurality of image data including a subject from a plurality of cameras, and outputs data obtained from coordinate conversion performed by referring to LUT data. The second control unit derives each of determination distances from optical centers of the plurality of image data with regard to the subject, selects one of the plurality of image data as selection image data on the basis of the determination distance, and rewrites the LUT data by deriving a coordinate corresponding to a pixel of the subject in the selection image data.

13 Claims, 18 Drawing Sheets

(56) References Cited

U.S. PATENT DOCUMENTS

| | | | |
|---|---|---|---|
| 9,712,759 B2* | 7/2017 | Venkataraman | ............................ H01L 27/14618 |
| 9,749,547 B2* | 8/2017 | Venkataraman | ..... H04N 5/2253 |
| 9,766,380 B2* | 9/2017 | Duparre | ............... H04N 5/2254 |
| 9,794,476 B2* | 10/2017 | Nayar | ................... H04N 5/2258 |
| 9,800,856 B2* | 10/2017 | Venkataraman | ......... G06T 7/557 |
| 9,813,617 B2* | 11/2017 | Venkataraman | ..... H04N 13/243 |
| 9,858,673 B2* | 1/2018 | Ciurea | ................. H04N 13/232 |
| 9,924,092 B2* | 3/2018 | Rodda | .................. H04N 5/2254 |
| 2004/0169617 A1* | 9/2004 | Yelton | ..................... G06T 15/04 345/1.1 |
| 2010/0220190 A1 | 9/2010 | Hiroshi | |
| 2012/0170812 A1 | 7/2012 | Kamiyama | |
| 2014/0112597 A1 | 4/2014 | Yu | |
| 2014/0160275 A1 | 6/2014 | Sakakibara et al. | |
| 2016/0260244 A1* | 9/2016 | Moravec | ............... G06T 15/205 |
| 2016/0292821 A1* | 10/2016 | Cho | ...................... G06T 3/4038 |
| 2017/0147866 A1* | 5/2017 | Tokui | ................. G06K 9/00248 |

FOREIGN PATENT DOCUMENTS

| | | |
|---|---|---|
| JP | 2007-226300 A | 9/2007 |
| JP | 2013-26801 A | 2/2013 |
| WO | WO-2011/036892 A1 | 3/2011 |

OTHER PUBLICATIONS

Chinese Office Action issued in correspinding Chinese Patent Application No. 201610274422.7 dated Sep. 5, 2018.

Communication pursuant to Article 94(3) EPC from the European Patent Office, in counterpart European Application No. 16164738.3, dated Mar. 28, 2019.

Notification of the Second Office Action from the State Intellectual Property Office of People's Republic of China in counterpart Application No. 201610274422.7, dated Mar. 29, 2019.

Notice of Reasons for Refusal from the Japanese Patent Office in counterpart application No. 2015-108715, dated May 14, 2019.

* cited by examiner

FIG. 8
(a)
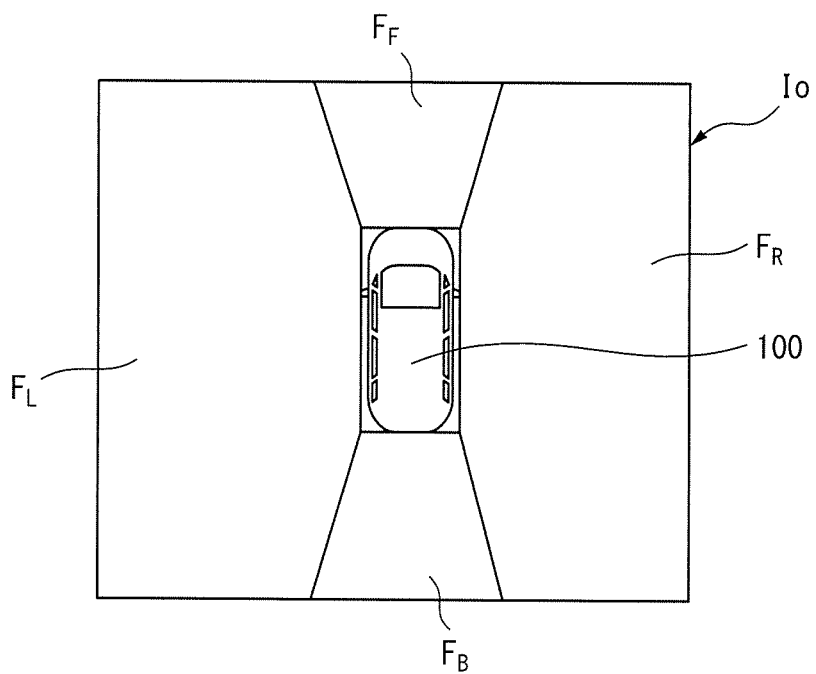
(b)
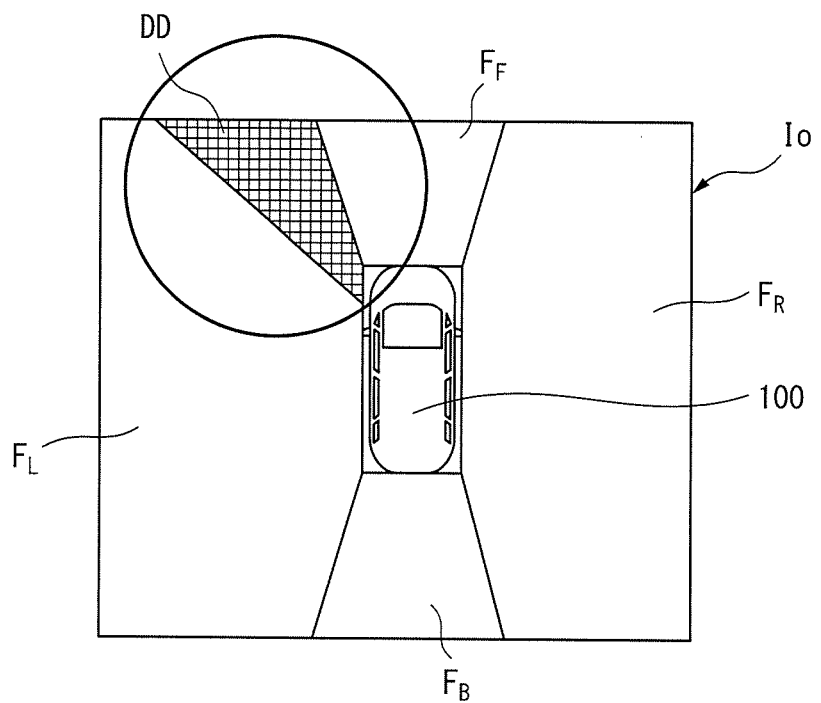

FIG. 9
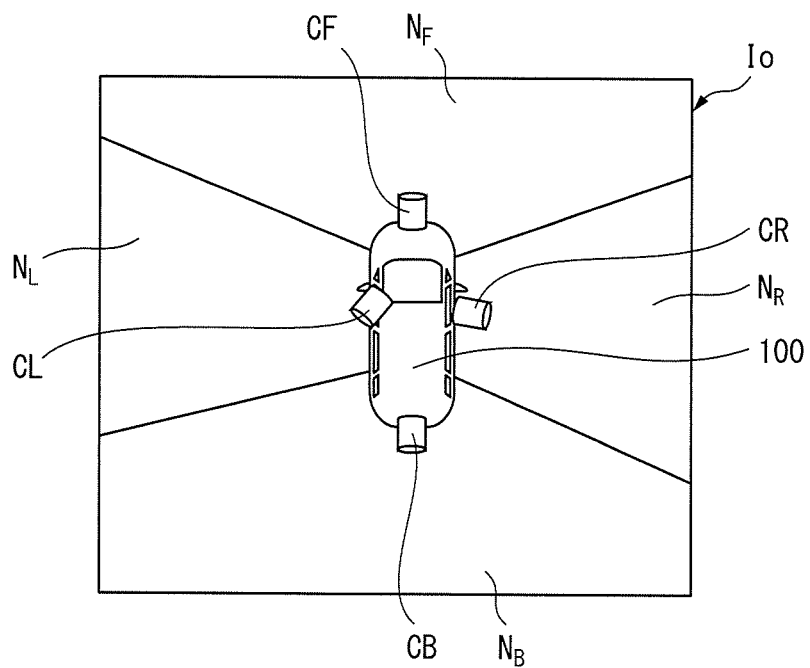
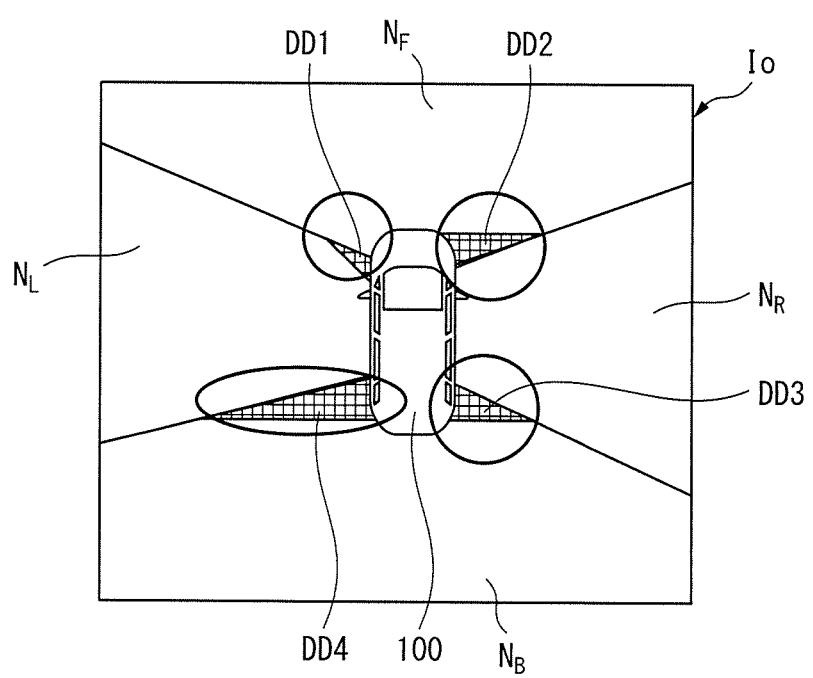

FIG. 13
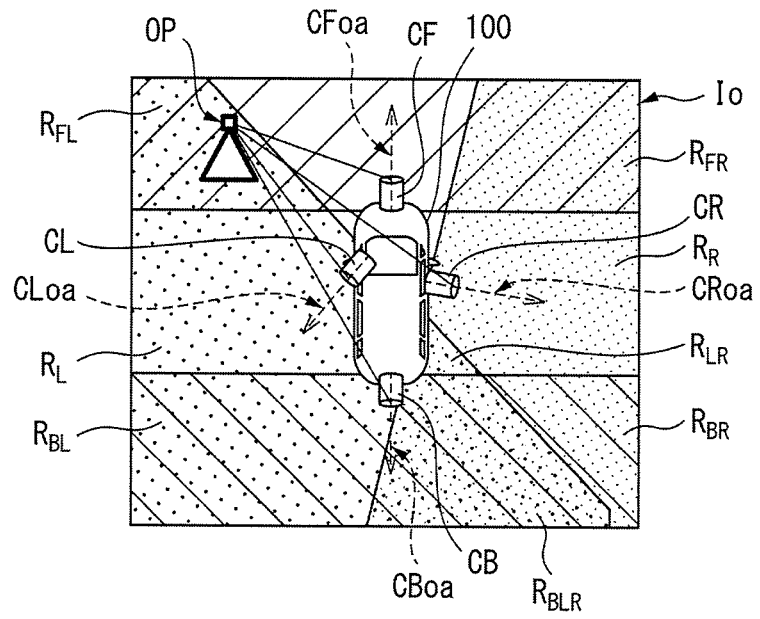
[IMAGE CAPTURING AREA OF EACH CAMERA]
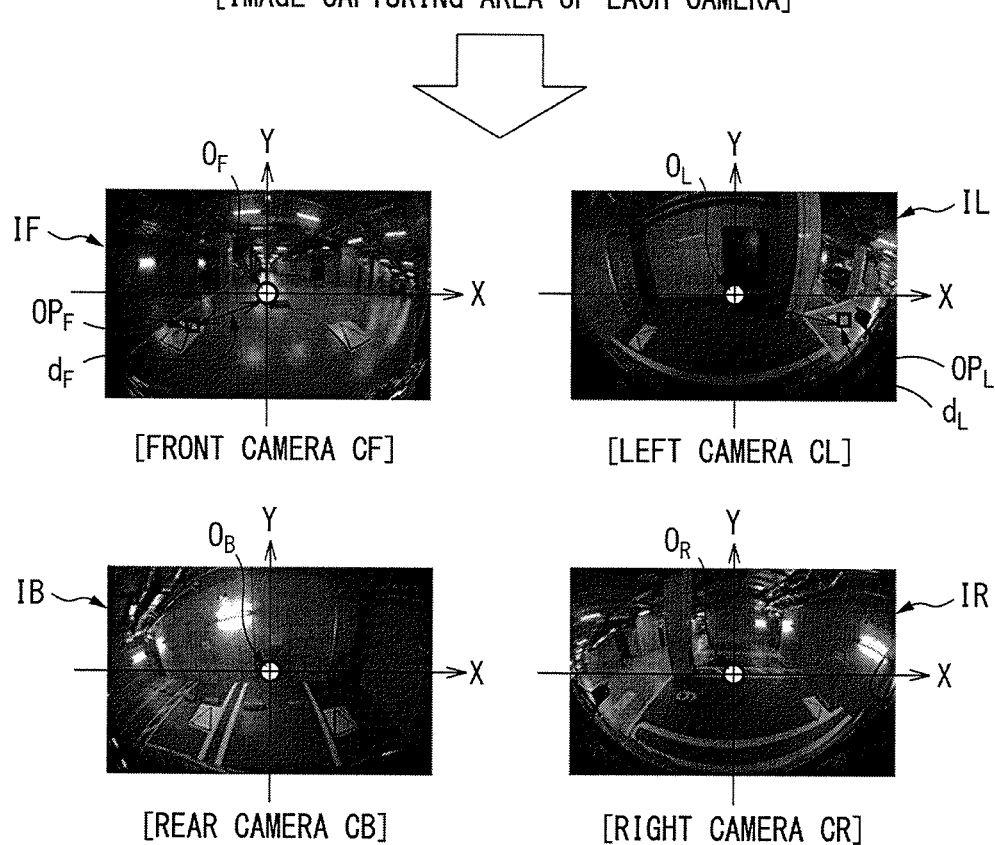
[FRONT CAMERA CF]　　[LEFT CAMERA CL]
[REAR CAMERA CB]　　[RIGHT CAMERA CR]

FIG. 14
(a)
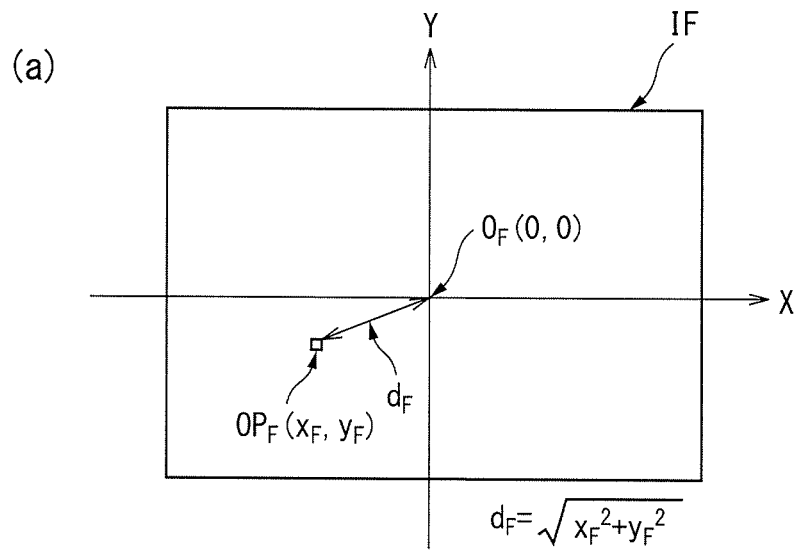
(b)
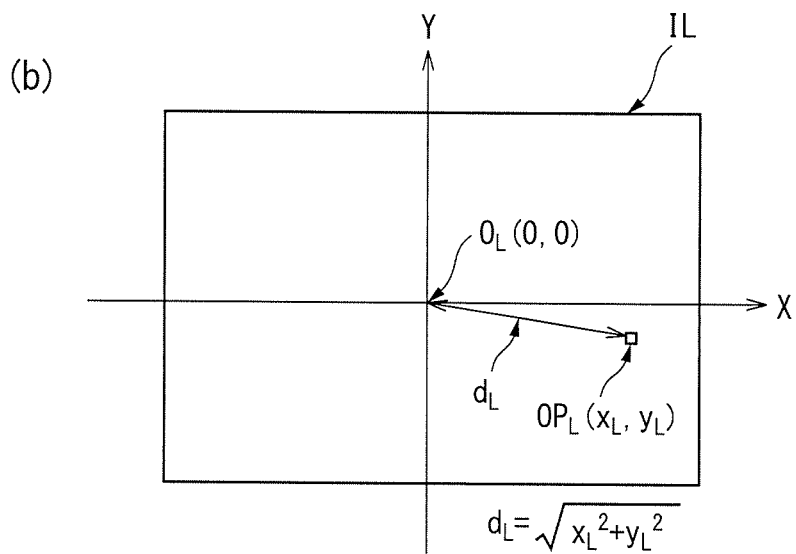

DRAWING APPARATUS, DRAWING METHOD, AND DRAWING PROGRAM

CROSS-REFERENCE TO RELATED APPLICATION

This application is based upon and claims the benefit of priority of the prior Japanese Patent Application No. 2015-108715, filed on May 28, 2015, the entire contents of which are incorporated herein by reference.

FIELD

The embodiments discussed herein are related to a drawing apparatus, a drawing method, and a drawing program.

BACKGROUND

In recent years, for example, an around view monitor has been put into practice. With the around view monitor, an automobile is provided with multiple cameras of which field angles are overlapping, and the images (videos) obtained from the multiple cameras are processed in composite processing, so that the driver may parallel park the automobile or park the automobile in the garage while the driver checks all around the automobile.

In other words, for example, a drawing apparatus has been put into practice. With the drawing apparatus, actual images obtained by multiple input apparatuses such as cameras are projected onto a three-dimensional projection surface which is deemed to be the ground, so that the drawing apparatus simulates a video as if the ground is seen from above.

Such a drawing apparatus (a generation apparatus of a composite image) is not limited to the around view monitor (multi-angle around view monitor) provided in the automobile. For example, the drawing apparatus may also be provided in trains, ships, aircrafts, or buildings, or may be applied to monitor cameras, home electric appliances, toys, or the like.

In the present specification, an around view monitor having four cameras provided at the front, the rear, the left, and the right of an automobile will be explained as an example of a drawing apparatus. But, as described above, the present embodiment may be applied to various kinds of fields or objects, and the number of cameras is not limited to four.

The composite image (drawn image) is not limited to an image overlooking from a high position (overhead view image). Alternatively, for example, it is to be understood that the composite image (drawn image) may be a bird's eye view image diagonally overlooking from the sky and a frog's eye view image looking up from below, or an image on which various kinds of composite processing is performed.

As described above, for example, various suggestions have been presented as drawing techniques for obtaining drawn images by processing multiple image data captured by multiple cameras. However, for example, when a drawn image (for example, an overhead view image) is simulated by processing multiple image data, for example, complicated processing is performed to, e.g., select image data obtained by a predetermined camera on the basis of a three-dimensional (3D) coordinate in order to obtain a high image-quality simulation result.

Alternatively, since multiple image data obtained with multiple cameras are selected on the basis of, e.g., the attachment positions of the cameras, there is a problem in that it is difficult to obtain a high image-quality simulation result (drawing data (drawn image)) sufficiently achieving the characteristics of each camera (lens).

Incidentally, in the past, various suggestions have been presented as drawing techniques for generating drawn images by processing multiple image data captured by multiple cameras.

Patent Document 1: International Publication Pamphlet No. WO2011/036892

SUMMARY

According to an aspect of the embodiments, there is provided a drawing apparatus including a first control unit and a second control unit. The first control unit receives a plurality of image data including a subject from a plurality of cameras, and outputs data obtained from coordinate conversion performed by referring to LUT data.

The second control unit derives each of determination distances from optical centers of the plurality of image data with regard to the subject, selects one of the plurality of image data as selection image data on the basis of the determination distance, and rewrites the LUT data by deriving a coordinate corresponding to a pixel of the subject in the selection image data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for explaining an example of a problem associated with camera arrangement of the drawing apparatus as illustrated in FIG. 7;

FIG. 9 is a diagram for explaining another example of a problem associated with the camera arrangement of the drawing apparatus as illustrated in FIG. 7;

FIG. 13 is a diagram for explaining an example of rewrite processing of LUT data in the drawing apparatus according to the present embodiment (part 1);

FIG. 14 is a diagram for explaining the example of the rewrite processing of the LUT data in the drawing apparatus according to the present embodiment (part 2);

DESCRIPTION OF EMBODIMENTS

Figure 1:
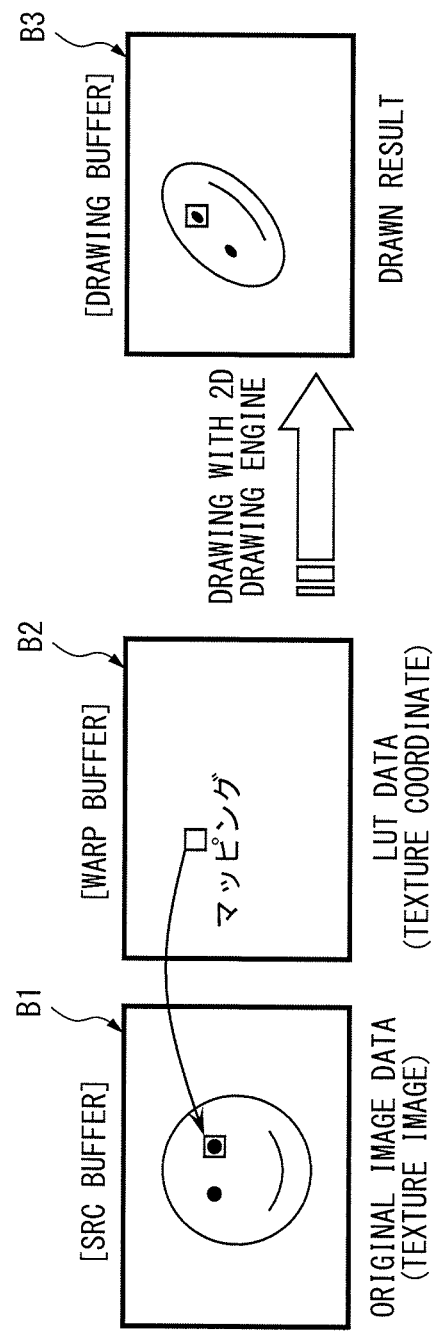
FIG. 1 is a diagram for explaining how a drawn image is obtained by applying LUT data to original image data.

First, before a drawing apparatus, a drawing method, and a drawing program according to the present embodiment are explained in details, an example of a drawing technique and a problem associated therewith will be explained with reference to FIGS. 1 to 9. FIG. 1 is a figure for explaining how a drawn image is obtained by applying LUT (Look Up Table) data to the original image data.

In FIG. 1, reference symbol B1 denotes a buffer (SRC buffer) storing original image data (texture image), reference symbol B2 denotes a buffer (WARP) buffer storing LUT data (texture coordinate). Reference symbol B3 denotes a buffer (drawing buffer) for storing a drawn image of a drawing result (simulation result).

As illustrated in FIG. 1, for example, a two-dimensional (2D) drawing engine performs coordinate conversion on the original image data stored in the SRC buffer B1 by referring to the LUT data stored in the WARP buffer B2, and stores the result thereof (drawing result) to the drawing buffer B3.

Figure 2:
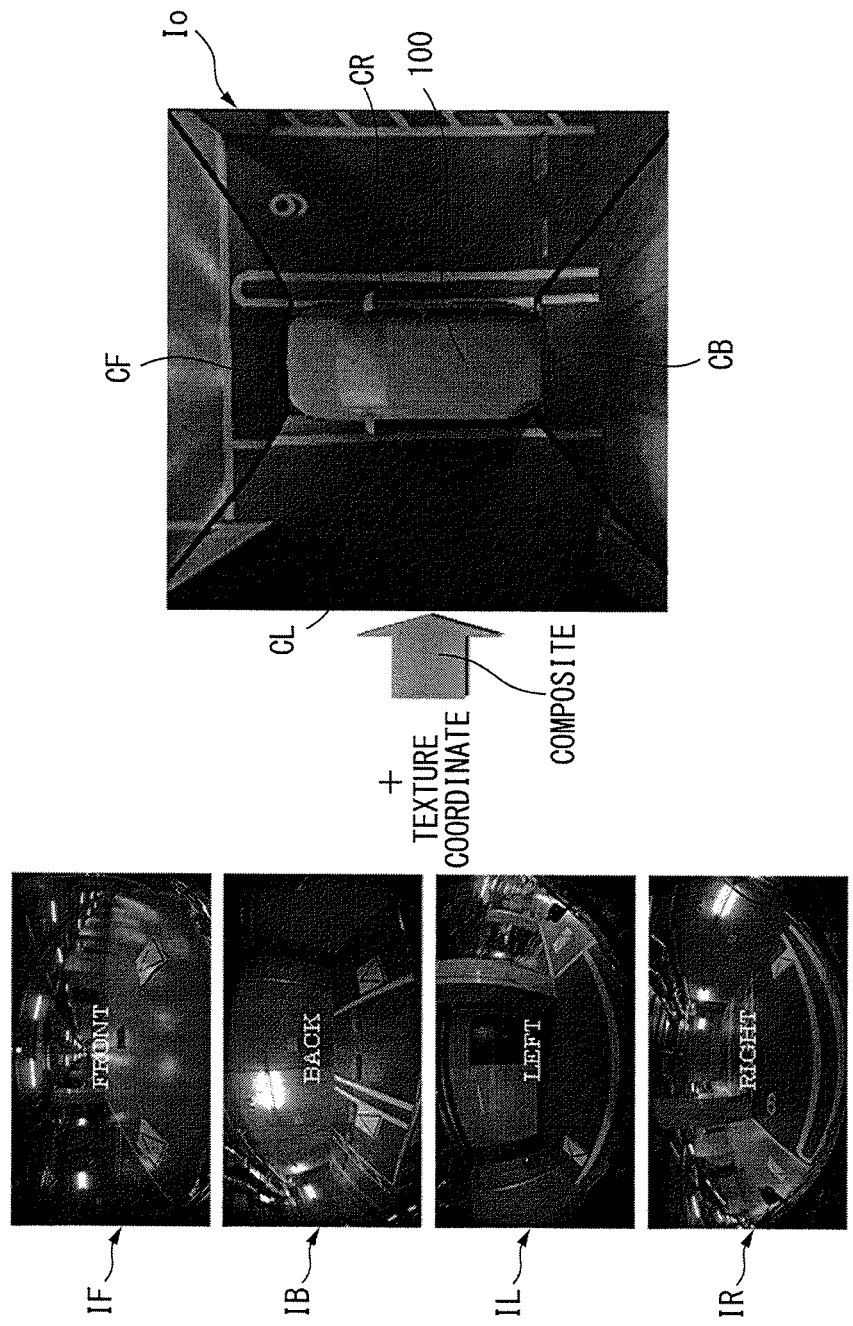
FIG. 2 is a diagram for explaining an example of a drawing apparatus provided in an automobile (part one)
Figure 3:
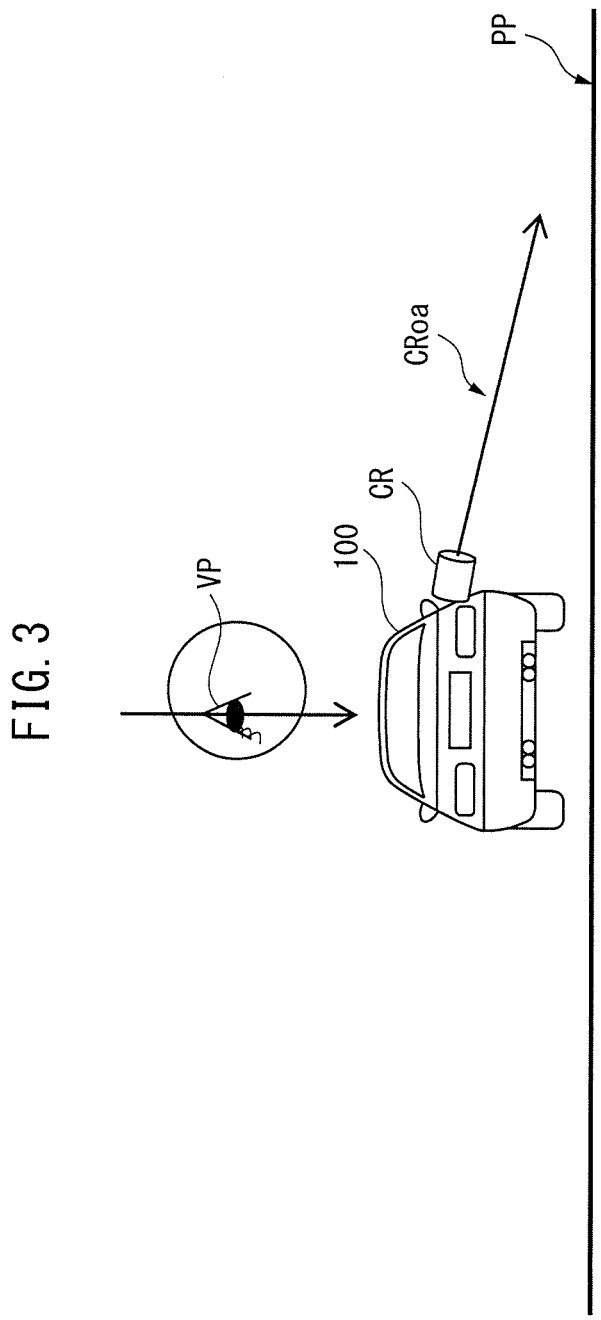
FIG. 3 is a diagram for explaining the example of the drawing apparatus provided in the automobile (part two)

FIG. 2 and FIG. 3 are figures for explaining an example of a drawing apparatus provided in an automobile, and are for illustrating an around view monitor generating an image of all around the automobile from image data captured by four cameras provided at the front, the rear, the left and the right of the automobile.

In FIG. 2, reference symbol 100 denotes an automobile (vehicle), reference symbol CF denotes a front camera, reference symbol CB denotes a rear camera, reference symbol CL denotes a left camera, and reference symbol CR denotes a right camera. Reference symbol IF denotes a front image captured by the front camera CF, reference symbol IB denotes a rear image captured by the rear camera CB, reference symbol IL denotes a left image captured by the left camera CL, reference symbol IR denotes a right image captured by the right camera CR, and reference symbol Io denotes a composed overhead view image (an image overlooking from a high location).

In FIG. 3, reference symbol VP denotes a viewpoint, reference symbol CRoa denotes an optical axis of the right camera CR (lens), and reference symbol PP denotes a projection surface (Z=0). As illustrated in FIG. 2 and FIG. 3, the drawing apparatus (around view monitor) has, for example, the cameras CF, CB, CL, CR of which field angles are 180 degrees and which are provided at the front, the rear, the left, and the right of the automobile 100, and composes the overhead view image Io on the basis of the images (image data) IF, IB, IL, IR provided by the cameras.

More specifically, for example, the drawing apparatus performs composite processing on the images IF, IB, IL, IR, and generates (draws) an image (overhead view image Io) on a three-dimensional projection surface corresponding to a projection surface (ground) PP where Z is zero in the visual field ranges of the cameras CF, CB, CL, CR.

In other words, as explained with reference to FIG. 1, the images (actual images) IF, IB, IL, IR provided from the cameras CF, CB, CL, CR are texture images, and are mapped on the basis of the texture coordinate (LUT data) calculated in accordance with the position of each camera stored in the buffer B2.

As explained above, a 2D drawing engine (two-dimensional graphics calculation apparatus) is used to calculate and output data which are mapped on the basis of the texture coordinate. This function will be referred to as a LUT (Look Up Table), and the buffer B2 holding the texture coordinate will be referred to as a WARP buffer.

In the present specification, an around view monitor will be explained as example, in which four cameras are provided at the front, the rear, the left, and the right of the automobile, and an overhead view image is generated. It is to be understood that the number of cameras is not limited to four, and the generated image is not limited to the overhead view image.

Further, the drawing apparatus is not limited to the around view monitor provided in the automobile. For example, the drawing apparatus may also be applied to drive monitors, or monitors provided in trains, ships, aircrafts, or buildings, or may be applied to monitor cameras, home electric appliances, toys, or the like.

Figure 4:
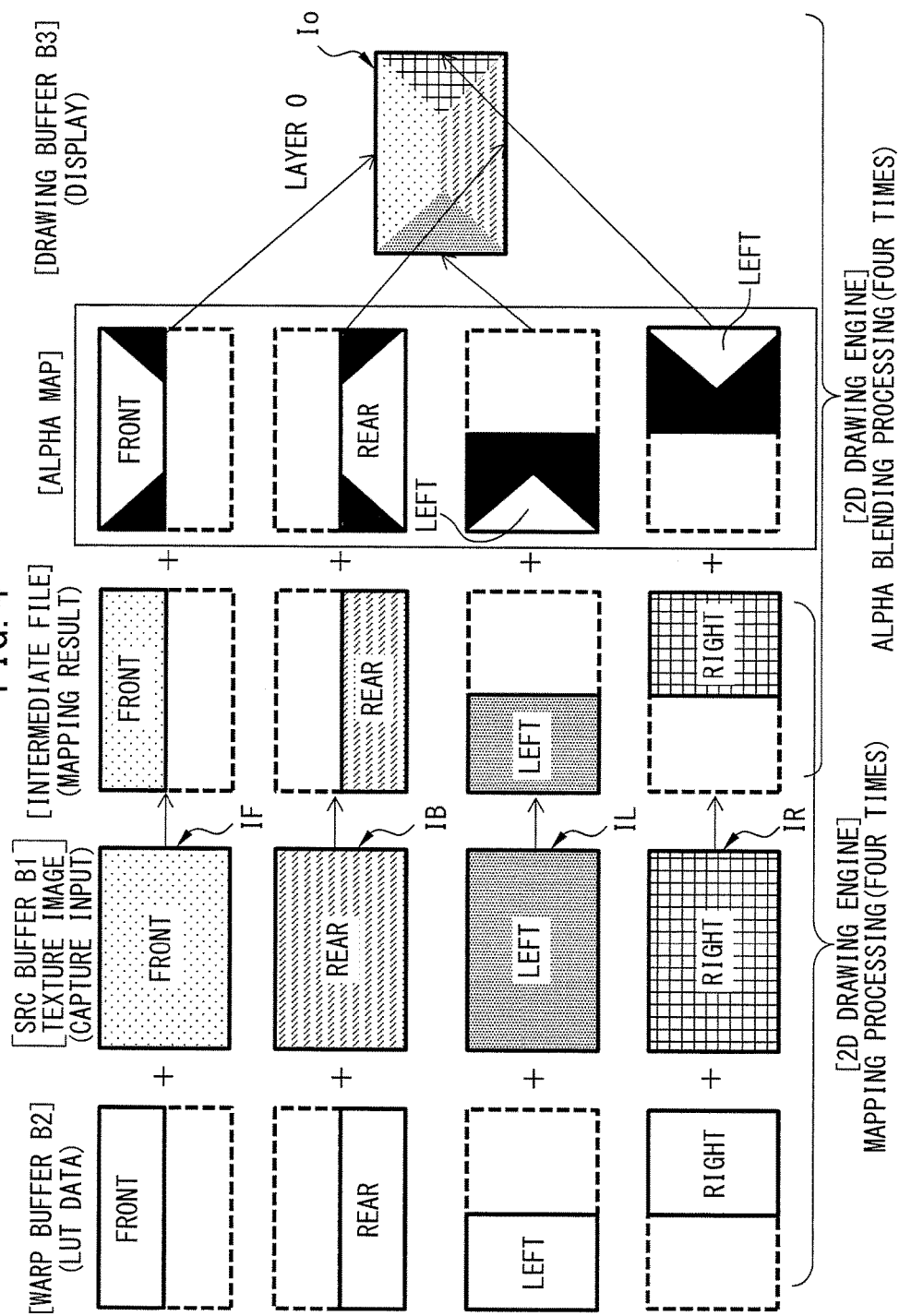
FIG. 4 is a diagram for explaining an example of drawing processing performed with the drawing apparatus as illustrated in FIGS. 2 and 3.

FIG. 4 is a figure for explaining an example of drawing processing performed by a drawing apparatus as illustrated in FIG. 2 and FIG. 3. As illustrated in FIG. 4, the texture images (captured inputs) IF, IB, IL, IR of the front, the rear, the left, and the right stored in the SRC buffer B1 are processed in the mapping processing by referring to the LUT data stored in the WARP buffer B2, and an intermediate files are generated.

The intermediate files (mapping result) of the front, the rear, the left, and the right are processed in alpha blending processing for defining a mask area (a solidly filled area in the alpha map in FIG. 4), and the areas of the front, the rear, the left, and the right stored in the drawing buffer B3 are determined as the drawing result. It is noted that the mapping areas (mask areas) of the alpha map are fixed.

In other words, in the overlapping area in the intermediate files of the front, the rear, the left, and the right, a determination is made as to in which of the intermediate files the data are used to generate the drawn image. As described above, the drawing buffer B3 (layer 0) stores the drawn image (overhead view image) Io, and the overhead view image Io thereof is read from the layer 0, and, for example, the overhead view image Io is displayed.

As illustrated in FIG. 4, for example, the 2D drawing engine performs the mapping processing four times in order to generate the intermediate files by applying the LUT data to the texture images IF, IB, IL, IR. Further, the mapping processing is performed four times to generate the drawn image by performing the alpha blending processing on the four intermediate files. In other words, in the drawing processing as illustrated in FIG. 4, the mapping processing with the 2D drawing engine is performed eight times.

Figure 5:
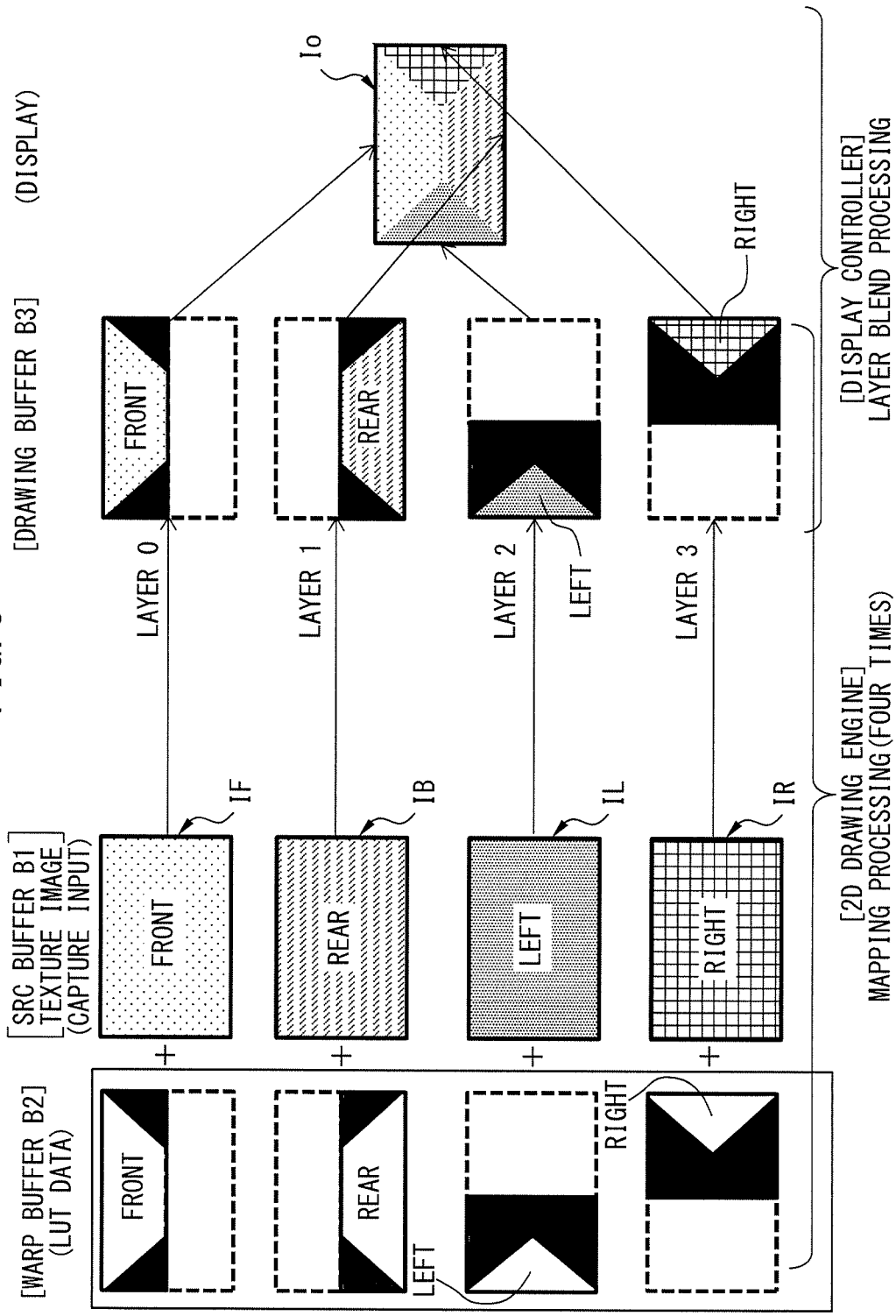
FIG. 5 is a diagram for explaining another example of drawing processing performed with the drawing apparatus as illustrated in FIGS. 2 and 3.

FIG. 5 is a figure for explaining another example of drawing processing performed with the drawing apparatus as illustrated in FIG. 2 and FIG. 3.

As illustrated in FIG. 5, the texture images IF, IB, IL, IR of the front, the rear, the left, and the right stored in the SRC buffer B1 are processed in the mapping processing by referring to the LUT data stored in the WARP buffer B2, and the drawn images of the front, the rear, the left, and the right are stored to the drawing buffer B3.

The LUT data include the mask areas (the solidly filled areas in the LUT data in FIG. 5), and drawn images (partially drawn images) obtained by processing the texture images IF, IB, IL, IR in the mapping processing on the basis of the LUT data are stored to four different layers 0 to 3 in the drawing buffer B3. It is noted that the mapping areas (mask areas) of the LUT data are fixed.

Then, for example, when the drawn image (overhead view image) Io is displayed on the display, the display controller reads four partially drawn images stored in the layers 0 to 3 of the drawing buffer B3, composes the overhead view image Io, and displays the overhead view image Io on the display.

As illustrated in FIG. 5, for example, the 2D drawing engine may perform the mapping processing only four times in order to generate the partially drawn images by applying the LUT data to the texture images IF, IB, IL, IR.

However, the four generated partially drawn images are stored to different layers 0 to 3, respectively, of the drawing buffer B3, and in order to display the drawn image on the display, the partially drawn images stored in the layers 0 to 3 are combined by the display controller.

As described above, in the drawing processing as illustrated in FIG. 4, the mapping processing with the 2D drawing engine is performed eight times. In the drawing processing as illustrated in FIG. 5, the four layers in the drawing buffer B3 are used. Further, in both of the drawing processing as illustrated in FIG. 4 and drawing processing as illustrated in FIG. 5, the mapping areas are fixed.

Figure 6:
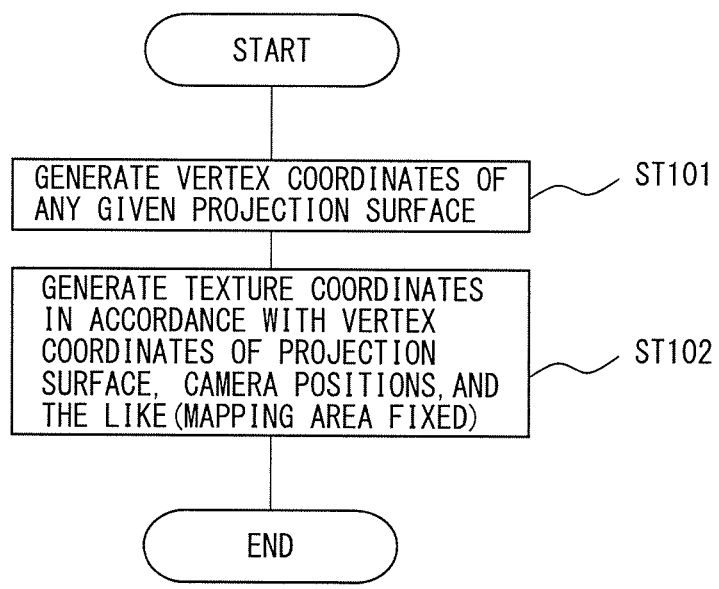
FIG. 6 is a flowchart for explaining an example of generation processing of LUT data in the drawing processing as illustrated in FIG. 5.

FIG. 6 is a flowchart for explaining an example of generation processing of LUT data in the drawing processing as illustrated in FIG. 5. As illustrated in FIG. 6, when the generation processing of the LUT data is started, vertex coordinates of any given projection surface are generated in step ST101, and step ST102 is subsequently executed.

For example, the vertex coordinates of the projection surface are the coordinates of the vertexes in the XYZ (three-dimensional) space generally used, e.g., when the overhead view image is generated from the images (IF, IB, IL, IR) captured by the cameras arranged at the front, the rear, the left, and the right of the automobile by performing the polygon processing.

In step ST102, the texture coordinates (LUT data) are generated in accordance with the camera positions, the vertex coordinates of the projection surface generated in step ST101, and the like, and then, the generation processing of the LUT data is finished.

In the texture coordinates generated on the basis of the vertex coordinates of the projection surface, the camera positions, and the like in step ST102, the mapping areas are fixed, for example, as explained with reference to FIG. 5.

Figure 7:
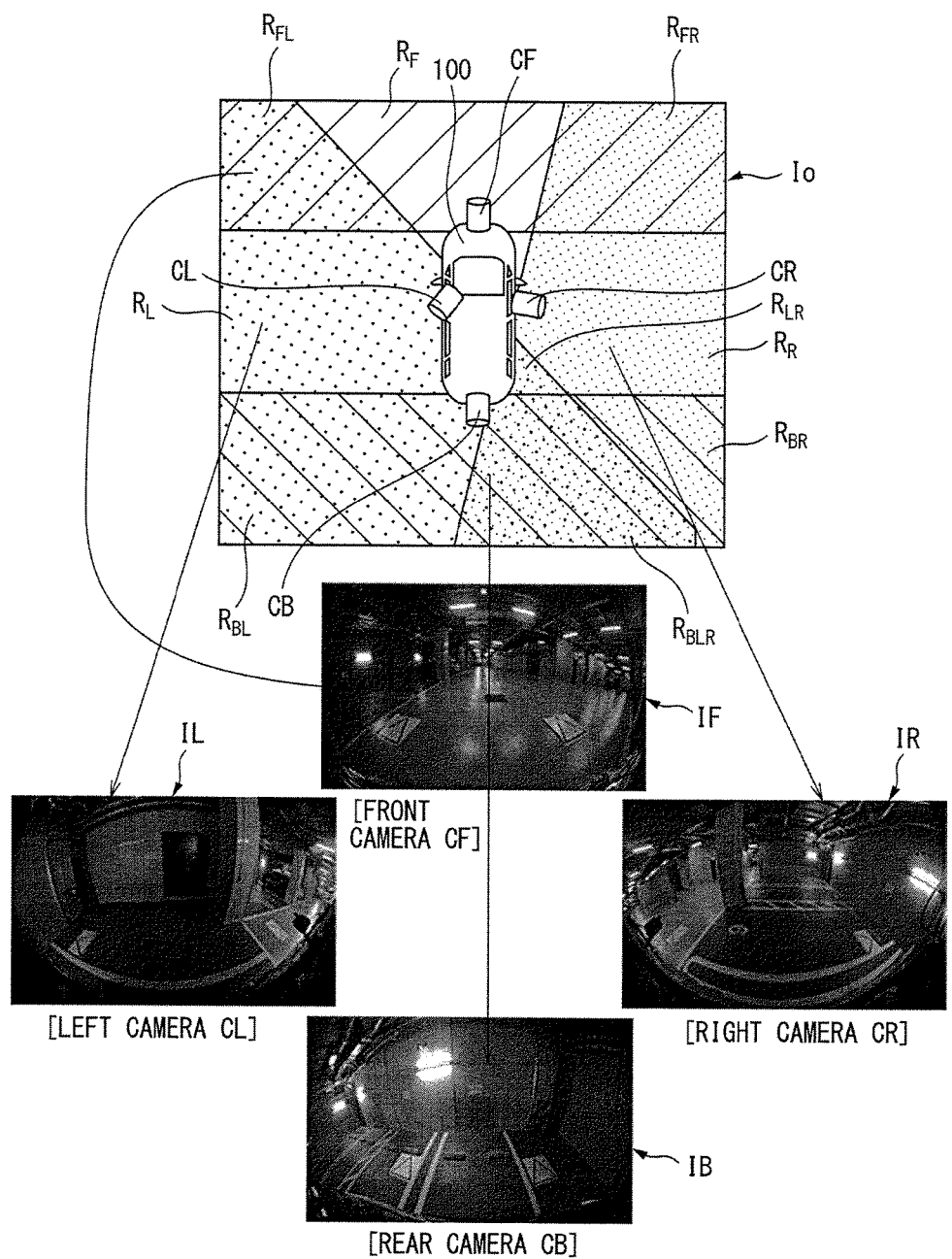
FIG. 7 is a diagram illustrating an example of camera arrangement of a drawing apparatus provided in an automobile.

FIG. 7 is a figure illustrating an example of camera arrangement of the drawing apparatus provided in the automobile. The front camera CF, the rear camera CB, the left camera CL, and the right camera CR provided at the front, the rear, the left, and the right of the automobile 100 are considered to include a field angle of 180 degrees.

Further, the front camera CF is attached toward the front center, and the rear camera CB is attached toward the rear center, the left camera CL is attached at about 45 degrees toward the left rear, and the right camera CR is attached at about 15 degrees toward the right rear. It is noted that the attachment angles of the cameras CF, CB, CL, CR are merely examples, and it is to be understood that there may be various cases.

In the overhead view image Io of FIG. 7, reference symbol $R_{FL}$ denotes an area in which the front image IF captured by the front camera CF and the left image IL captured by the left camera CL overlap each other, and reference symbol $R_{FR}$ denotes an area in which the front image IF and the right image IR captured by the right camera CR overlap each other. It is noted that reference symbol $R_F$ denotes an area in the front image IF that may be captured by only the front camera CF.

In the overhead view image Io, reference symbol $R_{BL}$ denotes an area in which the rear image IB captured by the rear camera CB and the left image IL overlap each other, reference symbol $R_{BR}$ denotes an area in which the rear image IB and the right image IR overlap each other, and reference symbol $R_{BLR}$ denotes an area in which the rear image IB, the left image IL, and the right image IR overlap each other. It is noted that reference symbol $R_{LR}$ denotes an area in which the left image IL and the right image IR overlap each other.

Further, in the overhead view image Io, reference symbol $R_L$ denotes an area in the left image IL that may be captured by only the left camera CL, and reference symbol $R_R$ denotes an area in the right image IR that may be captured by only the right camera CR.

Therefore, the front image IF captured by the front camera CF may draw the areas $R_{FL}$, $R_F$, and $R_{FR}$ in the overhead view image Io. The rear image IB captured by the rear camera CB may draw the areas $R_{BL}$, $R_{BLR}$, and $R_{BR}$ in the overhead view image Io.

Further, the left image IL captured by the left camera CL may draw the areas $R_{FL}$, $R_L$, $R_{BL}$, $R_{BLR}$, and $R_{LR}$ in the overhead view image Io. The right image IR captured by the right camera CR may draw the areas $R_{FR}$, $R_R$, $R_{LR}$, $R_{BR}$, and $R_{BLR}$ in the overhead view image Io.

In FIG. 7, the areas that cannot be captured because these areas are obstructed by the automobile 100 itself, e.g., $R_{BLR}$ and $R_{LR}$, are not taken into consideration. In reality, these areas area $R_{BLR}$ and $R_{LR}$ are included in $R_{BR}$ and $R_R$, respectively.

FIG. 8 is a figure for explaining an example of problem associated with the camera arrangement of the drawing apparatus as illustrated in FIG. 7, and explains the drawing (composition) of the overhead view image Io according to fixed camera mapping processing. FIG. 8 (a) illustrates an example of fixed camera mapping areas, and FIG. 8 (b) illustrates an overhead view image Io drawn at the moment.

When the overhead view image Io is drawn as illustrated in FIG. 8 (a), and the fixed camera mapping areas $F_F$, $F_B$, $F_L$, and $F_R$ are applied to the front camera CF, the rear camera CB, the left camera CL, and the right camera CR provided at the front, the rear, the left, and the right of the automobile 100, then, for example, FIG. 8 (b) is obtained.

In other words, the images IF, IB, IL, IR from the cameras CF, CB, CL, CR are selected on the basis of the fixed camera mapping areas $F_F$, $F_B$, $F_L$, $F_R$, and the overhead view image Io is drawn.

However, as explained with reference to FIG. 7, for example, when the left camera CL is not attached toward the center at the left side and is attached at about 45 degrees toward the left rear, the image IL captured by the left camera CL is unable to cover the entire area of the mapping area $F_L$, and there may be a missed area DD.

As described above, when the overhead view image is drawn by performing the fixed camera mapping processing, the mapping area of each camera (the used range of image (video)) is determined in a fixed manner. Therefore, an image captured by a camera that does not show the position in question may be used depending on the camera position.

As a result, the drawn overhead view image may include a missed area. This problem of the missed area in the overhead view image (drawn image) is related to selection of the optimum (the most high quality) image chosen from among the images captured by multiple cameras.

In other words, when the overhead view image is drawn by performing the fixed camera mapping processing, a low quality image is used in the drawing result, or an image captured by a camera that does not actually show a desired portion is used. This makes it difficult to obtain the optimum drawing result.

The user may be able to finely adjust the used range of the video of each camera on the basis of the drawing result (overhead view image). However, for example, by way of visual inspection with eyes, it is difficult to find which camera provides the highest quality video and is optimum for any given pixel.

FIG. 9 is a figure for explaining another example of a problem associated with camera arrangement of the drawing apparatus as illustrated in FIG. 7, and is for explaining drawing of the overhead view image Io in accordance with the camera mapping processing of the nearest position so as to use the image captured by the camera at the closest position. FIG. 9 (a) illustrates an example of a camera mapping area at the nearest position. FIG. 9 (b) illustrates an overhead view image Io drawn at that moment.

When the overhead view image Io is drawn as illustrated in FIG. 9 (a), and the camera mapping areas $N_F$, $N_B$, $N_L$, and $N_R$ of the nearest positions are applied to the front camera CF, the rear camera CB, the left camera CL, and the right camera CR provided on the automobile 100, then, for example, FIG. 9 (b) is obtained.

In other words, the images IF, IB, IL, IR from the cameras CF, CB, CL, CR are selected on the basis of the camera mapping areas $N_F$, $N_B$, $N_L$, and $N_R$ at the nearest positions, and the overhead view image Io is drawn.

However, for example, when the left camera CL is attached at about 45 degrees toward the left rear, and the right camera CR is attached at about 15 degrees toward the right rear, missed areas DD1, DD2, DD3, DD4 may occur in portions of four corners of the automobile 100.

As described above, when the overhead view image is drawn by performing the camera mapping processing of the nearest positions, for example, the direction of the attached camera is not taken into consideration. Therefore, because of the portions not presented in the images due to the direction of the cameras, the drawn overhead view image includes missed areas.

In other words, when the overhead view image is drawn by performing the camera mapping processing of the nearest positions, a low quality image is also used in the drawing result, or an image captured by a camera that does not actually show a desired portion is used. This makes it difficult to obtain the high image-quality drawing data (the optimum drawing result). It is noted that, for example, in order to determine whether any given pixel is shown or not by taking the direction of the camera into consideration, additional processing for this determination is performed, which is not preferable.

Figure 10:
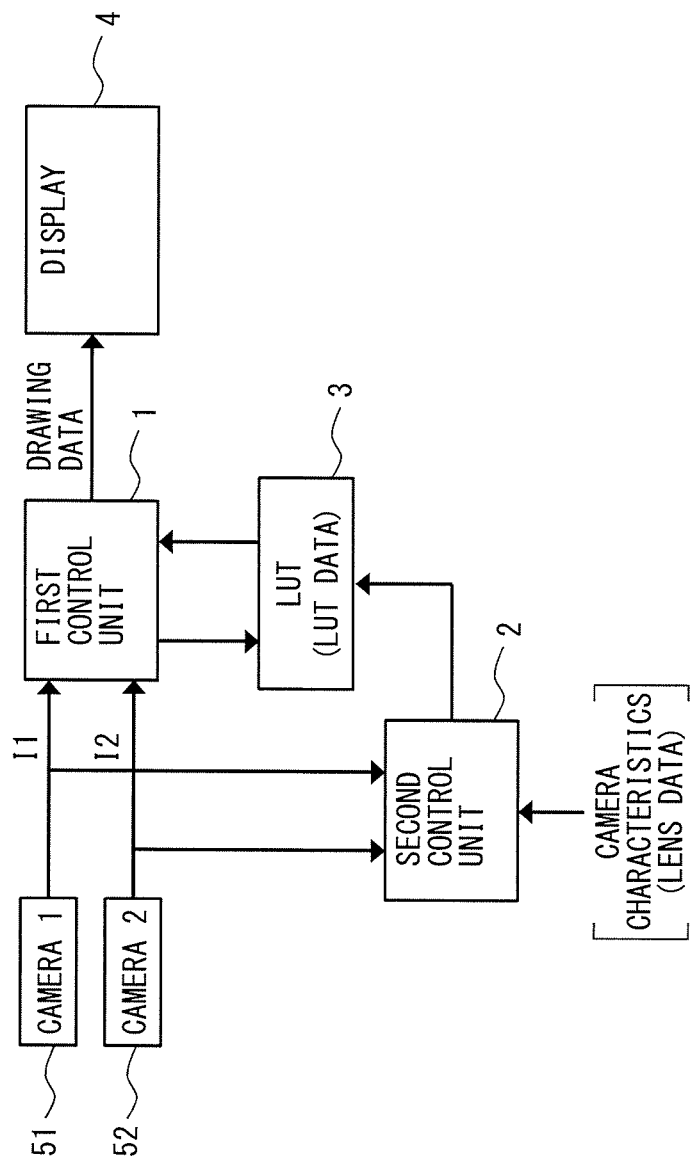
FIG. 10 is a block diagram schematically illustrating the drawing apparatus according to the present embodiment.

Embodiments of a drawing apparatus, a drawing method, and a drawing program will be hereinafter explained with reference to appended drawings. FIG. 10 is a block diagram schematically illustrating the drawing apparatus according to the present embodiment.

As illustrated in FIG. 10, the drawing apparatus according to the present embodiment includes a first control unit (2D drawing engine) 1, a second control unit (LUT calculation apparatus) 2, an LUT 3, and is configured to generate a drawn image (composite image) from multiple image data I1, I2 captured by multiple cameras 51, 52. In this camera, at least two cameras are provided, and at least two images captured by the at least two cameras include an area showing the same subject.

In the drawing apparatus according to the present embodiment, the first control unit 1 receives multiple image data I1, I2 including the subject from multiple cameras 51, 52, and outputs the data, obtained from coordinate conversion performed by referring to the LUT (LUT data) 3, to the display 4 as the drawing data.

The second control unit 2 derives a determination distance (d) from the optical center of each of the multiple image data I1, I2 with regard to the subject, and selects one of the multiple image data, as selection image data, on the basis of the determination distances.

Further, the second control unit 2 derives the coordinate corresponding to the pixel of the subject in the selection image data, and rewrites the LUT data stored in the LUT 3. For example, the second control unit 2 derives the coordinates corresponding to the same location (the same pixel of the subject) that is shot in the multiple image data I1, I2 on the basis of the camera characteristics (the camera characteristics of the cameras), and rewrites the LUT data.

The camera characteristics may include, for example, characteristics caused by a lens such as lens data (lens distortion data) and characteristics caused by an image-capturing device (for example, a CMOS image sensor), an image engine, and the like.

However, in order to simplify the explanation, the multiple cameras 51, 52 are considered to include the same field angle of the lens, the same image capturing device, and the like, and the camera characteristics are described by focusing mainly on the image-quality in each image capturing area due to the lens characteristics.

Figure 11:
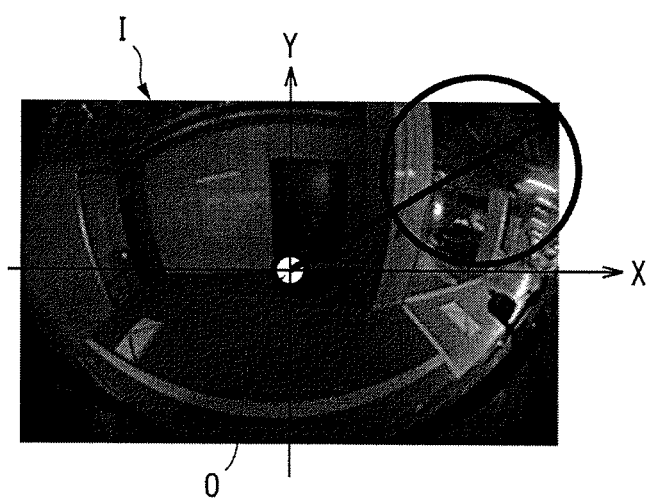
FIG. 11 is a diagram for explaining an example of lens characteristics of a camera.

FIG. 11 is a figure for explaining an example of lens characteristics of the camera, and illustrates an example of the image data I (I1, I2) captured by the cameras (51, 52). As illustrated in FIG. 11, in a peripheral portion where the distance from the image center O is long in image data (two-dimensional image data on a frame memory) I, the resolution and the focal power are low, and the distortion is large, and it is understood that the image-quality is low.

In other words, the lens of the camera that is applied to the drawing apparatus is usually lenses having wide field angle (for example, field angle of 180 degrees) which is called fisheye lens or (super) wide-angle lens, which achieves a high image-quality in an image capturing area close to the optical axis of the lens (a central portion where the distance from the image center O is short).

This is, in general, a wide-angle (fisheye) lens achieves higher drawing precision at a pixel closer to the optical axis center (image center) because of vignette and compression, and achieves lower drawing precision at a pixel farther from the optical axis center. Therefore, when a pixel representing any given point in the real world (the position in question OP of the subject) is considered, the highest image-quality pixel of all the cameras may be said to be normally a pixel closest to the optical axis center.

Therefore, in the drawing apparatus according to the present embodiment as illustrated in FIG. 10, for example, the second control unit 2 rewrites the LUT data so as to select, as the selection image data, one of the multiple image data I1, I2 whichever the determination distance d is the shortest on the basis of the camera characteristics (lens characteristics).

The drawing apparatus as illustrated in FIG. 10 works even when the lens characteristics of the camera 51 are not such that the image-quality simply deteriorates in accordance with the length of the determination distance d. For example, the drawing apparatus as illustrated in FIG. 10 works even when the lens characteristics of the camera 51 are such that the image-quality decreases until the determination distance d becomes a predetermined distance but the image-quality thereafter improves and then the image-quality decreases again.

In other words, for example, when the determination distance d is more than a predetermined distance and attains a higher image-quality, the second control unit 2 multiplies the determination distance d by a constant (<1) in order to determine the LUT data used for selecting any one of the image data I1 and I2 from the determination distance d on the basis of the lens characteristics.

As described above, for example, when there is an area where the image-quality is high even though the determination distance d is long, the determination distance d corresponding to the area is multiplied by a constant which is less than "1", so that this makes it easy to select image data in a high image-quality area.

For example, e.g., when the field angles of the lenses of the cameras 51, 52 are different, or when the characteristics based on the image capturing devices and the like are different in the cameras 51, 52, the optimum image data may be selected by performing the predetermined processing on the determination distance d. It is noted that such processing may be achieved by applying, for example, various kinds of known methods.

For example, the drawing apparatus according to the present embodiment explained above may be applied to the around view monitor having four cameras, which are attached to the front, the rear, the left, and the right of the automobile, and the images captured by these cameras are processed in the composite processing, so that an overhead view image is generated (drawn) and displayed on the display 4.

The present embodiment is not limited to the around view monitor provided in the automobile. For example, the present embodiment may also be applied to drive monitors, or monitors provided in trains, ships, aircrafts, or buildings, or may be applied to monitor cameras, home electric appliances, toys, or the like. The number of cameras is not limited to four, and the generated image is not limited to the overhead view image.

Further, the field angles of multiple cameras and the resolutions of the captured images are usually the same, but it is not necessary to apply the same field angle and the resolution. In this case, for example, the comparison processing performed by the second control unit 2 (the selection processing of the image data based on the determination distance d) is modified to select the optimum image data as the selection data.

Figure 12:
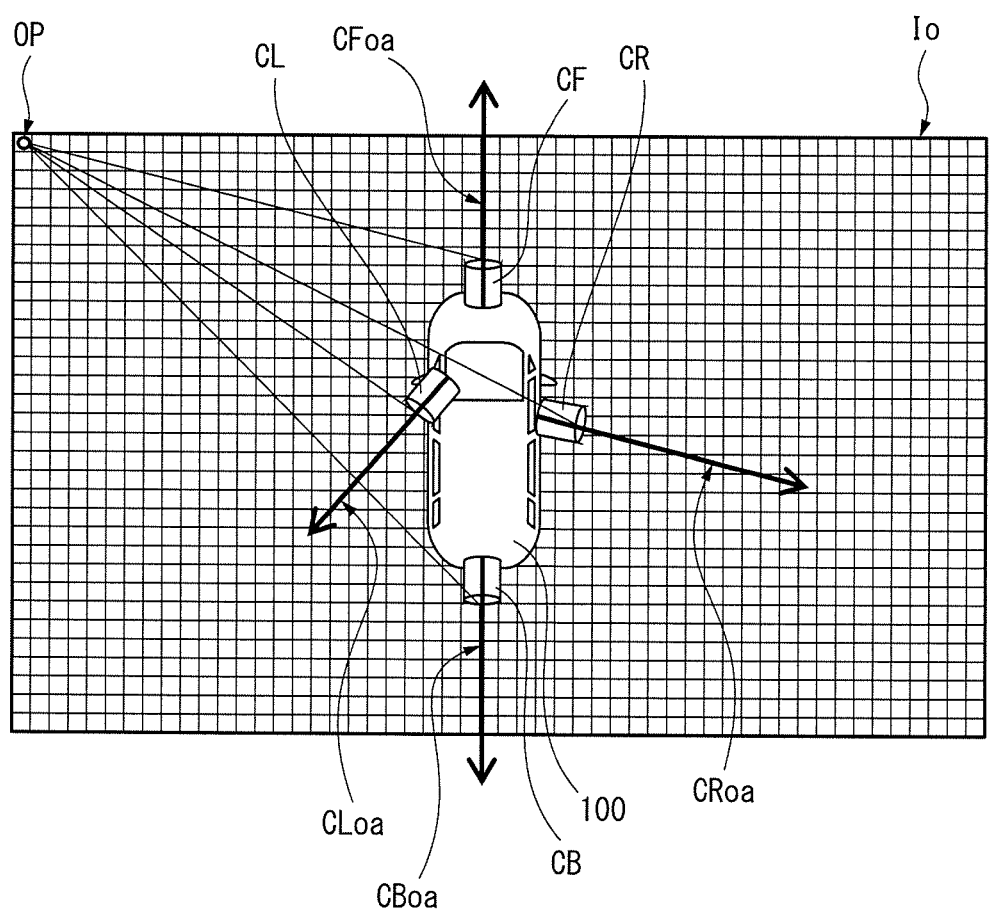
FIG. 12 is a diagram for explaining image data captured by each camera of the drawing apparatus provided in the automobile.

FIG. 12 is a figure for explaining image data captured by each camera of the drawing apparatus provided in the automobile. FIG. 12 illustrates a case of an around view monitor generating an image all around the automobile (overhead view image) Io from the image data (IF, IB, IL, IR) captured by four cameras CF, CB, CL, CR provided at the front, the rear, the left, and the right of the automobile (vehicle) 100.

In FIG. 12, the left camera CL is attached at about 45 degrees toward the left rear, and the right camera CR is attached at about 15 degrees toward the right rear, just like FIG. 7 explained above. In other words, the optical axis CFoa of the front camera CF is oriented toward the front center, the optical axis CBoa of the rear camera CB is oriented toward the rear center, the optical axis CLoa of the left camera CL is oriented at about 45 degrees toward the left rear, and the optical axis CRoa of the right camera CR is oriented at about 15 degrees toward the right rear.

The following case will be considered: as described above, for example, an overhead view image (an image of a three-dimensional projection surface corresponding to a projection surface where Z is zero (ground)) Io is composed (drawn) from the image data IF, IB, IL, IR captured by the cameras CF, CB, CL, CR of which field angle is 180 degrees and which are provided at the front, the rear, the left, and the right of the automobile 100.

As illustrated in FIG. 12, first, the subject (the surrounding) is captured by all of the cameras CF, CB, CL, CR. At this occasion, for example, a position in a direction of the left front (the position in question OP of the subject) in the overhead view image Io is out of the field angle. Therefore, the position cannot be captured by the rear camera CB and the right camera CR, and is included only in the image data IF and IL captured by the front camera CF and left camera CL.

In the present embodiment, the data having the most preferable image-quality are selected as the drawing data (selection data) from among multiple image data obtained by capturing the same subject in the image data IF, IB, IL, IR captured by all the cameras CF, CB, CL, CR, and the data having the most preferable image-quality are used for generation of the overhead view image Io.

In other words, according to the present embodiment, the LUT data are rewritten so that the highest image-quality data are selected from at least two image data obtained by capturing the position in question OP of the subject in an overlapping manner, and the selected highest image-quality data are used for drawing the overhead view image Io.

FIG. 13 and FIG. 14 are figures for explaining an example of rewrite processing of LUT data in the drawing apparatus according to the present embodiment. FIG. 13 corresponds to FIG. 7 explained above, and FIG. 13 illustrates the position in question OP of the subject in the overhead view image Io and the images (image data) IF, IB, IL, IR captured by the cameras CF, CB, CL, CR attached to the front, the rear, the left, and the right of the automobile 100.

FIG. 14 (a) illustrates processing of the front image data IF. FIG. 14 (b) illustrates processing of the left image data IL. As illustrated in FIG. 13, the position in question OP of the subject exists in the area $R_{FL}$. Therefore, the position in question OP of the subject is included in the image data IF and IL as the position in question $OP_F$ and $OP_L$, but the position in question OP of the subject is not included in the image data IB and IR.

In other words, in the drawing apparatus as illustrated in FIG. 10 explained above, the second control unit 2 recognizes that the position in question OP of the subject is out of the image capturing range of the rear camera CB and the right camera CR depending on the camera characteristics (lens data (lens distortion data)).

The lens distortion data includes an association table including, for example, a vector with respect to the optical axis of the camera (or an incident angle formed by the optical axis) and a two-dimensional coordinate where an image is formed (or an actual image height).

Therefore, the second control unit 2 performs the processing explained with reference to FIG. 14 on the front image data IF captured by the front camera CF and the left image data IL captured by the left camera CL, and performs the processing to determine which of the image data are adopted as the selection image data.

As illustrated in FIG. 14 (*a*), for example, the position in question OP of the subject in the overhead view image Io is captured as the position in question $OP_F$ in the image data (the frame image stored in the frame memory) IF captured by the front camera CF.

Where the position of the image center in the frame image IF is denoted as an origin point $O_F$ (0, 0), and the coordinate of the position in question $OP_F$ is denoted as $(x_F, y_F)$, a distance (determination distance) $d_F$ from the origin point $O_F$ to the position in question $OP_F$ is derived as $d_F=(x_F^2, y_F^2)^{1/2}$.

As illustrated in FIG. 14 (*b*), for example, the position in question OP of the subject in the overhead view image Io is captured as the position in question $OP_L$ in the image data (the frame image stored in the frame memory) IL captured by the left camera CL.

Where the position of the image center in the frame image IL is denoted as an origin point $O_L$ (0, 0), and the coordinate of the position in question $OP_L$ is denoted as $(x_L, y_L)$, a determination distance $d_L$ from the origin point $O_F$ to the position in question $OP_F$ is derived as $d_L=(X_L^2, y_L^2)^{1/2}$.

Then, the determination distances $d_F$ and $d_L$ are compared, and in a case where, for example, $d_F<d_L$ holds, the image data IF in which the determination distance is shorter is selected as the selection image data. In other words, in the drawing apparatus as illustrated in FIG. 10 explained above, the second control unit 2 rewrites the LUT data so as to select the image data IF in which the determination distance is shorter as the selection image data.

It is to be understood that, when the position in question OP of the subject is captured only in a single piece of image data, the second control unit 2 rewrites the LUT data so as to select the image data as the selection data.

For example, when many cameras are used, and the position in question OP of the subject is captured in three or more image data, the second control unit 2 rewrites the LUT data so as to select the image data of which determination distance d is the shortest as the selection data.

As described above, according to the present embodiment, high image-quality drawing data (overhead view image) may be obtained by performing simple processing of deriving and comparing two-dimensional determination distance d between the image center (origin point) O and the position in question OP in each frame image.

According to the present embodiment, when the image data are included in any one of the image data IF, IB, IL, IR captured by the multiple cameras CF, CB, CL, CR, the image data are adopted as the selection data. Therefore, this may eliminate missed portions in the drawn image (overhead view image).

In other words, according to the present embodiment, the image data (camera video) most suitable for each pixel which differs depending on the camera position may be automatically determined (selected). Since the highest image-quality camera video for the pixel is selected from among the images actually showing the pixel, the high image-quality video may be obtained without considering the direction of the camera. Further, in the calculation, it is sufficient to derive only the distance on the two-dimensional coordinates. Therefore, the processing may be performed at a high speed.

Figure 15:
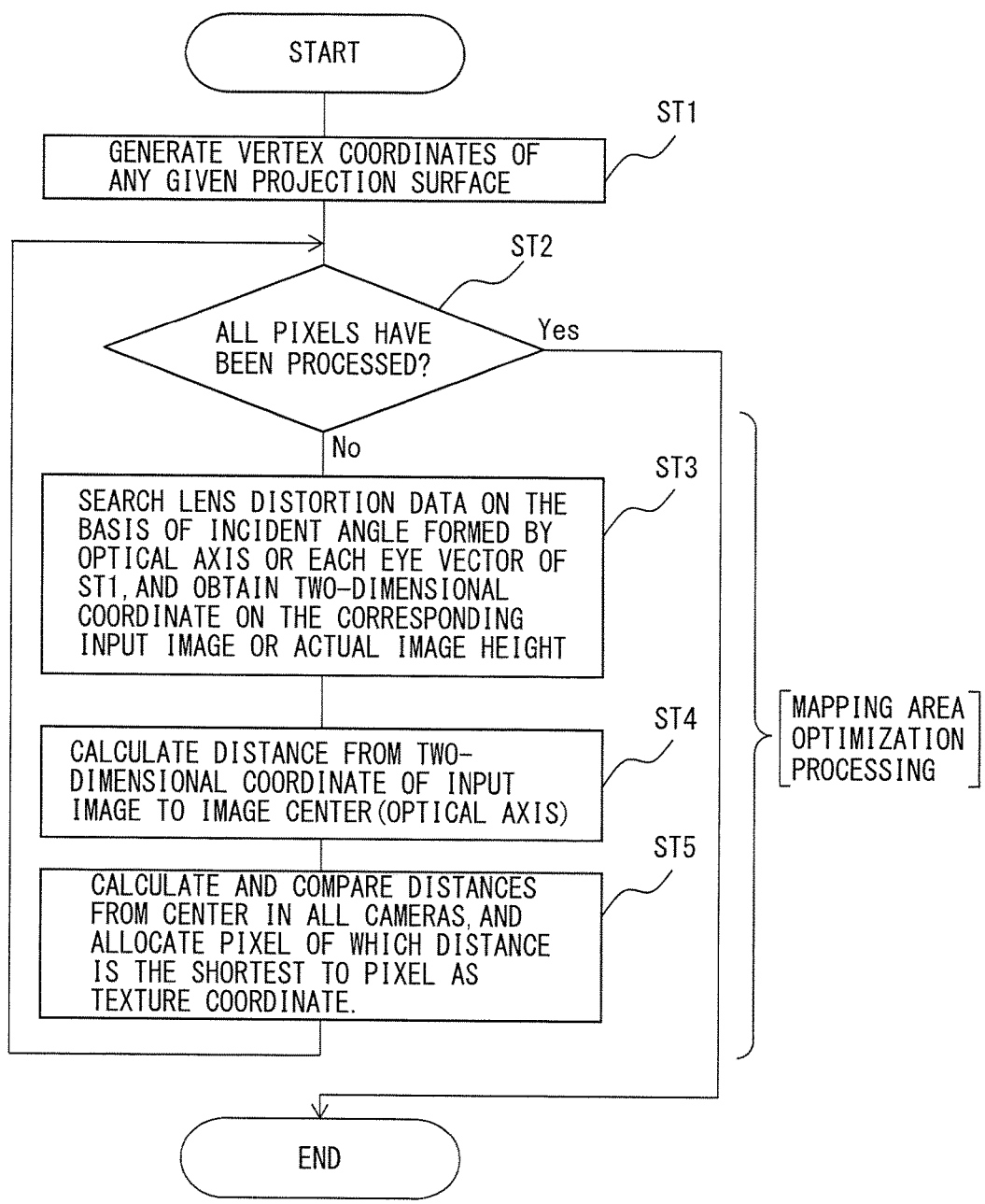
FIG. 15 is a flowchart for explaining an example of generation processing of LUT data in the drawing apparatus according to the present embodiment.

FIG. 15 is a flowchart for explaining an example of generation processing of the LUT data in the drawing apparatus according to the present embodiment. As illustrated in FIG. 15, when the generation processing of the LUT data is started, the vertex coordinates of any given projection surface are generated in step ST1, and step ST2 is subsequently execute. In step ST2, a determination is made as to whether all the pixels are processed or not.

In step ST2, when all the pixels are determined to be processed (Yes), the generation processing of the LUT data is terminated. When all the pixels are determined not to be processed (No), step ST3 is subsequently executed.

As explained above, the vertex coordinates of the projection surface are the coordinates of the vertexes in the three-dimensional space generally used, e.g., when the overhead view image is generated from the images captured by the cameras arranged at the front, the rear, the left, and the right of the automobile by performing the polygon processing.

In step ST3, the lens distortion data are searched on the basis of the incident angle formed by the optical axis or each eye vector of the vertex coordinates of the projection surface generated in step ST1, and the two-dimensional coordinate on the corresponding input image or the actual image height is obtained, and then, step ST4 is subsequently executed.

In step ST4, the distance (determination distance d) from the two-dimensional coordinate of the input image to the image center (optical axis) is calculated, and then, step ST5 is subsequently executed. In step ST5, the distances from the center in all the cameras are calculated and compared, and the pixel of which distance is the shortest is allocated to the pixel as the texture coordinate. Then, as described above, when all the pixels are determined to be processed in step ST2, the generation processing of the data is terminated.

For example, e.g., when the lens distortion data (lens characteristics) are different between the cameras, or when there is a complicated change in the relationship between the distance from the center and the image-quality, the processing is performed to, e.g., multiply the determination distance of the image captured by each camera by a constant.

Figure 16:
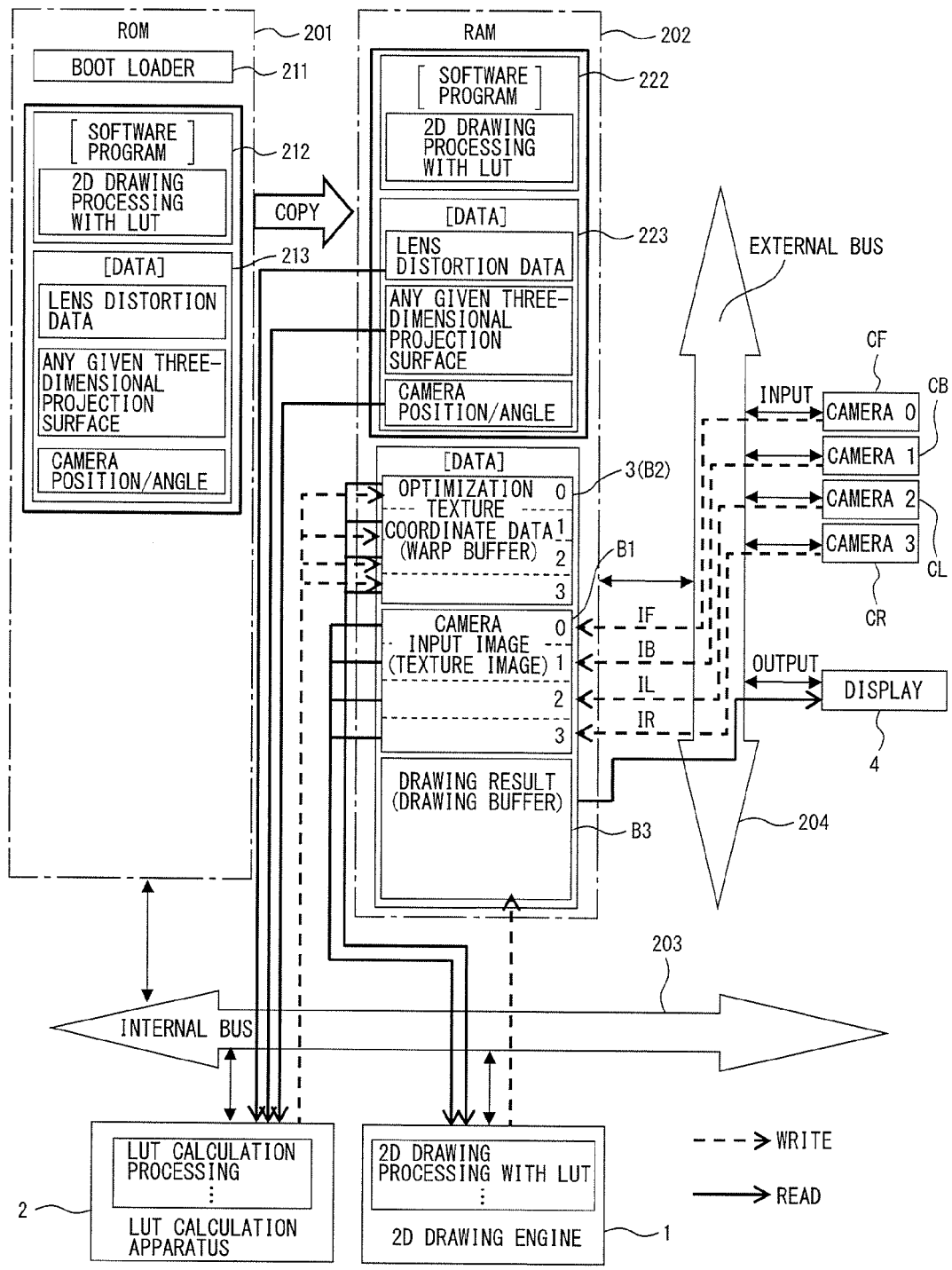
FIG. 16 is a block diagram illustrating an example of configuration of a drawing apparatus as illustrated in FIG. 10.

FIG. 16 is a block diagram illustrating an example of configuration of a drawing apparatus as illustrated in FIG. 10. As illustrated in FIG. 16, an example of drawing apparatus includes a 2D drawing engine 1, an LUT calculation apparatus 2, a ROM (Read Only Memory) 201, and a RAM (Random Access Memory) 202. Further, an example of drawing apparatus includes an internal bus 203, an external bus 204, multiple (four) cameras CF, CB, CL, CR, and a display 4.

The ROM 201 stores (arranges) a boot loader 211 operating immediately after boot, a software program 212 performing 2D drawing processing with LUT, and data 213 such as lens distortion data, any given three-dimensional original projection surface, and camera position/angle.

The RAM 202 includes, for example, a memory area (software program 222 and data 223) where the software program 212 and the data 213 stored in the ROM 201 are copied and extracted on the basis of the boot loader 211 during booting. The data 223 correspond to the camera characteristics (lens data) in FIG. 10.

Further, the RAM 202 includes a buffer (SRC buffer) B1 storing a camera input image (texture image), an LUT 3

(WARP buffer B2) storing LUT data, and a memory area (data) used as a buffer (drawing buffer) B3 storing a drawing result.

The 2D drawing engine (first control unit) 1 is connected via the internal bus 203 to the RAM 202, reads the software program 222 from the RAM 202, and executes the 2D drawing processing with the LUT.

In other words, the 2D drawing engine 1 not only reads the camera input images (image data IF, IB, IL, IR) from the buffer B1, but also reads the LUT data from the LUT 3, and outputs the data, which are obtained by applying coordinate conversion by referring to the LUT data, to the buffer B3 as the drawing data.

It is noted that the cameras CF, CB, CL, CR, and the display 4 are connected via the external bus 204 to the RAM 202, and the image data IF, IB, IL, IR captured by the cameras CF, CB, CL, CR are input and written via the external bus 204 into the buffer B1. The drawing data stored in the buffer B3 (for example, the overhead view image) are output via the external bus 204 and displayed on the display 4.

The LUT calculation apparatus (second control unit) 2 is connected via the internal bus 203 to the RAM 202, reads the data (camera characteristics) 223 from the RAM 202, and executes the LUT calculation processing. This LUT calculation processing corresponds to, for example, processing for rewriting the LUT data on the basis of the distance between the image center O and the position in question OP of the subject for each of the frame images (texture images IF, IB, IL, IR) stored in the buffer B1 of the RAM (memory) 202.

Subsequently, overview of operation of the drawing apparatus as illustrated in FIG. 16 will be explained. The ROM 201 previously stores the boot loader 211, the software program 212, and data (optimization texture coordinate data).

First, the processing is started from the head of the boot loader 211. With the processing of the boot loader 211, the software program 212 and the data 213 are stored to the RAM 202. Then, when the processing of the boot loader 211 is finished, the software program 222 is started, and the image data IF, IB, IL, IR captured by the cameras CF, CB, CL, CR are input via the external bus 204 into the buffer B1.

For example, the LUT calculation apparatus (second control unit) 2 calculates the resolution of each camera with respect to each pixel (the determination distance d between the connection point and the optical axis center) of drawing buffer B3 (drawn image Io) by referring to lens distortion data and data of any given three-dimensional projection surface and camera position/angle (camera characteristics).

The resolutions of the pixels in the images (frame images) IF, IB, IL, IR of all the cameras are compared, and the value of the pixel captured by a camera having the highest resolution is output as mapping target, i.e., the LUT data are calculated (rewritten).

Then, the 2D drawing engine 1 performs the 2D drawing processing with the LUT by referring to the buffer B2 (LUT data) and the buffer B1 (texture image). It is noted that the drawing result is written to the drawing buffer B3, and the drawing result is read and displayed on the display 4.

The 2D drawing engine 1, the LUT calculation apparatus 2, the ROM 201, the RAM 202, and the internal bus 203 may be formed as a single semiconductor integrated circuit (drawing apparatus LSI). It is noted that the cameras CF, CB, CL, CR, and the display 4 are connected via the external bus 204 to the drawing apparatus LSI.

Alternatively, the LUT calculation apparatus 2 may be separated from the drawing apparatus LSI and provided as a single tool. For example, the LUT calculation apparatus 2 may be provided as a tool for the automobile (100) provided with the drawing apparatus LSI including the 2D drawing engine 1, the ROM 201, the RAM 202, and the like, and the multiple cameras CF, CB, CL, CR, and the display 4.

The present embodiment may be provided as a drawing program for the drawing apparatus, and in this case, the drawing program may be stored to the ROM 201, the memory of the LUT calculation apparatus 2, and the like. It is noted that the ROM 201 may be, for example, an electrically rewritable flash memory and the like, and for example, the software program 212 and the data 213 may be configured to be updatable.

Figure 17:
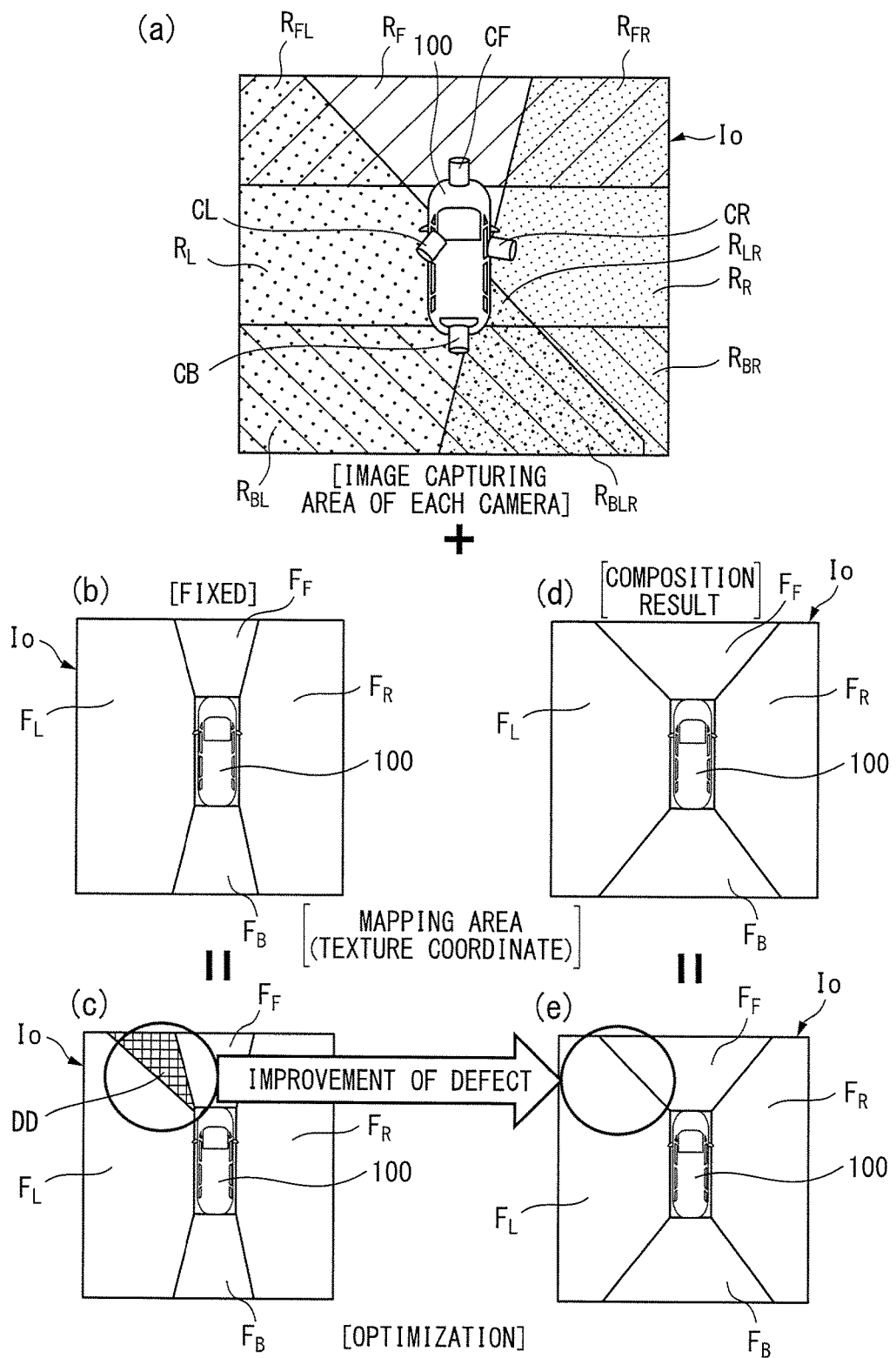
FIG. 17 is a diagram for explaining the effects of the drawing apparatus according to the present embodiment.

FIG. 17 is a figure for explaining effects of the drawing apparatus according to the present embodiment. FIG. 17 (a) corresponds to FIG. 7 and FIG. 13, and FIG. 17 (b) and FIG. 17 (c) correspond to FIG. 8 (a) and FIG. 8 (b). FIG. 17 (d) and FIG. 17 (e) are drawings corresponding to FIG. 17 (b) and FIG. 17 (c) according to the present embodiment.

As illustrated in FIG. 17 (b) and FIG. 17 (c), for example, a missed area DD occurs, when the drawn image Io is generated, and the fixed camera mapping areas $F_F$, $F_B$, $F_L$, and $F_R$ are applied to the cameras CF, CB, CL, CR provided at the front, the rear, the left, and the right of the automobile 100. Further, the drawn image Io as illustrated in FIG. 17 (c) is not a high quality image that takes full advantage of the image data IF, IB, IL, IR captured by the cameras CF, CB, CL, CR.

In contrast, as illustrated in FIG. 17 (d) and FIG. 17 (e), according to the present embodiment, in the drawn image Io as explained above, the camera mapping areas $F_F$, $F_B$, $F_L$, and $F_R$ are optimized by the image data IF, IB, IL, IR.

In other words, the drawn image To generated by the drawing apparatus according to the present embodiment would not be defective (would not include a missed area DD) as long as it is captured by at least any one of the cameras CF, CB, CL, CR. Further, the drawn image Io generated by the drawing apparatus according to the present embodiment is a high quality image that takes full advantage of the image data IF, IB, IL, IR.

As described above, according to the present embodiment, for example, even when the positions and the orientations of the cameras are different, the high quality drawn image involving less variation in image-quality and involving less mapping miss may be generated by making full use of the image data captured by the camera in the state. In particular, this has a greater effect with a wide-angle (fisheye) lens that is greatly affected by, e.g., vignette and variation in the scale (distortion of the image).

Figure 18:
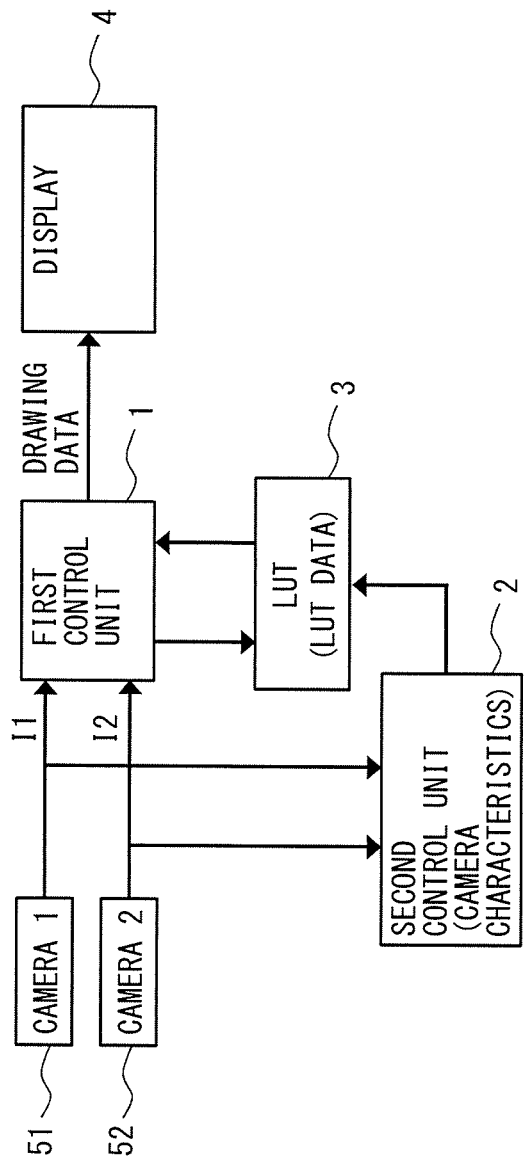
FIG. 18 is a block diagram schematically illustrating a modification of the drawing apparatus as illustrated in FIG. 10.

FIG. 18 is a block diagram schematically illustrating a modification of the drawing apparatus as illustrated in FIG. 10. As is evident from comparison between FIG. 18 and FIG. 10 explained above, in the present modification, the second control unit 2 receives the image data I1, I2 instead of the camera characteristics (lens data) of the multiple cameras 51, 52 prepared in advance.

In other words, in the drawing apparatus according to the modification as illustrated in FIG. 18, for example, in the initial setting, a subject adopted as a predetermined pattern is captured by the cameras 51, 52, and the image data I1, I2 thereof are input into the second control unit 2.

For example, the second control unit 2 calculates the camera characteristics of the cameras 51, 52 from the image data I1, I2 obtained by causing the cameras 51, 52 to capture the predetermined pattern, and selects the selection image data by referring to the camera characteristics thus calculated.

In the modification as illustrated in FIG. 18, for example, it is a little bit troublesome to calculate the camera characteristics performed as the initial setting, but in this case, it is possible to set the camera characteristics including not only the characteristics caused by the lens but also characteristics caused by the image capturing device, the image engine, and the like.

The configurations other than the setting of the camera characteristics with the second control unit 2 are the same as the cameras 51, 52, the first control unit 1, the second control unit 2, the LUT 3, and the display 4 explained with reference to FIG. 10, and the explanation thereabout is omitted.

It is noted that the present embodiment is not limited to the around view monitor generating the overhead view image by arranging the four cameras at the front, the rear, the left, and the right of the automobile. In other words, the present embodiment may also be applied to drive monitors, or monitors provided in trains, ships, aircrafts, or buildings, or may be applied to monitor cameras, home electric appliances, toys, or the like.

The number of cameras is not limited to four, and as long as the same subject is shown in at least two captured images, the present embodiment may be applied. The generated drawn image is not limited to the overhead view image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A drawing apparatus comprising:
a drawing engine configured to receive a plurality of image data including a subject from a plurality of cameras, and output data obtained from coordinate conversion performed by referring to LUT data;
a LUT calculation apparatus configured to derive each of determination distances from optical centers of the plurality of image data with regard to the subject, select one of the plurality of image data as selection image data on the basis of the determination distance, and rewrite the LUT data by deriving a coordinate corresponding to a pixel of the subject in the selection image data; and
a memory configured to store each of the plurality of image data as a frame image, wherein
an optical center of the plurality of image data corresponds to a position of an image center in each of the frame images,
with regard to the subject, the determination distance d is a distance from the position of the image center to the subject in each of the frame images,
the LUT calculation apparatus selects the selection image data by referring to camera characteristics including lens distortion data of the plurality of cameras,
in the frame image, the position of the image center is denoted as an origin point (0, 0), and a coordinate of a position in question of the subject is denoted as (x, y), the determination distance d is derived as;
$d=(x^2+y^2)^{1/2}$, and
the LUT calculation apparatus multiplies the determination distance of a first area by a constant which is less than 1, when image-quality of the first area is higher than predetermined image-quality of the first area.

2. The drawing apparatus as claimed in claim 1, wherein the LUT calculation apparatus selects the selection image data by referring to position and angle data of each of the plurality of cameras and the camera characteristics of the plurality of cameras prepared in advance.

3. The drawing apparatus as claimed in claim 1, wherein the LUT calculation apparatus selects the selection image data by referring to position and angle data of each of the plurality of cameras and the camera characteristics of the plurality of cameras derived from the plurality of image data.

4. The drawing apparatus as claimed in claim 1, wherein the LUT calculation apparatus selects, as the selection image data, image data of which the determination distance d is the shortest from the plurality of image data.

5. The drawing apparatus as claimed in claim 1, wherein the LUT calculation apparatus performs processing on all areas of the frame image.

6. The drawing apparatus as claimed in claim 1, wherein the memory includes a LUT for storing the LUT data.

7. The drawing apparatus as claimed in claim 1, the drawing apparatus further comprising:
a display configured to display the drawing data which are output from the drawing engine.

8. The drawing apparatus as claimed in claim 1, the drawing apparatus further comprising:
a bus configured to connect the drawing engine to the memory, and connect the LUT calculation apparatus to the memory.

9. A drawing method for receiving a plurality of image data including a subject from a plurality of cameras, and outputting data obtained from coordinate conversion performed by referring to LUT data, the drawing method comprising:
deriving each of determination distances from optical centers of the plurality of image data with regard to the subject;
selecting one of the plurality of image data as selection image data on the basis of the determination distance; and
rewriting the LUT data by deriving a coordinate corresponding to a pixel of the subject in the selection image data, wherein
each of the plurality of image data is stored to a memory as a frame image,
an optical center of the plurality of image data corresponds to a position of an image center in each of the frame images,
with regard to the subject, the determination distance d is a distance from the position of the image center to the subject in each of the frame images,
the selecting one of the plurality of image data selects the selection image data by referring to camera characteristics of the plurality of cameras, in the frame image, the position of the image center is denoted as an origin point (0, 0), and a coordinate of a position in question of the subject is denoted as (x, y),
the determination distance d is derived as:
$d=(x^2+y^2)^{1/2}$, and the determination distance of a first area is multiplied by a constant which is less than 1, when image-quality of the first area is higher than predetermined image-quality of the first area.

10. The drawing method as claimed in claim 9, wherein the selecting one of the plurality of image data selects the selection image data by referring to position and angle data of each of the plurality of cameras and the camera characteristics of the plurality of cameras prepared in advance.

11. The drawing method as claimed in claim 9, wherein the selecting one of the plurality of image data selects the selection image data by referring to position and angle data of each of the plurality of cameras and the camera characteristics of the plurality of cameras derived from the plurality of image data.

12. The drawing method as claimed in claim 9, wherein the selecting one of the plurality of image data selects image data of which the determination distance d is the shortest as the selection image data, from the plurality of image data.

13. A non-transitory computer-readable storing medium storing a drawing program for a drawing apparatus including a control device which receives a plurality of image data including a subject from a plurality of cameras, and outputs data obtained from coordinate conversion performed by referring to LUT data, the drawing program causing the control device to execute:

deriving each of determination distances from optical centers of the plurality of image data with regard to the subject;

selecting one of the plurality of image data as selection image data on the basis of the determination distance; and rewriting the LUT data by deriving a coordinate corresponding to a pixel of the subject in the selection image data, wherein each of the plurality of image data is stored to a memory as a frame image, an optical center of the plurality of image data corresponds to a position of an, image center in each of the frame images, with regard to the subject, the determination distance d is a distance from the position of the image center to the subject in each of the frame images, the selecting one of the plurality of image data selects the selection image data by referring to camera characteristics of the plurality of cameras in the frame image, the position of the image center is denoted as an origin point (0, 0), and a coordinate of a position in question of the subject is denoted as (x, y), the determination distance d is derived as:

$d = (x^2 + y^2)^{1/2}$ , and the determination distance of a first area is multiplied by a constant which is less than 1, when image-quality of the first area is higher than predetermined image-quality of the first area.

* * * * *